(12) United States Patent
Malur Srinivasan et al.

(10) Patent No.: US 11,481,670 B2
(45) Date of Patent: Oct. 25, 2022

(54) BIAS VISUALIZATION FOR DATA SETS

(71) Applicant: FUJITSU LIMITED, Kawasaki (JP)

(72) Inventors: Ramya Malur Srinivasan, San Diego, CA (US); Ajay Chander, San Francisco, CA (US)

(73) Assignee: FUJITSU LIMITED, Kawasaki (JP)

( * ) Notice: Subject to any disclaimer, the term of this patent is extended or adjusted under 35 U.S.C. 154(b) by 852 days.

(21) Appl. No.: 16/396,242

(22) Filed: Apr. 26, 2019

(65) Prior Publication Data

US 2020/0342349 A1    Oct. 29, 2020

(51) Int. Cl.
| | |
|---|---|
| G06N 20/00 | (2019.01) |
| G06T 13/80 | (2011.01) |
| G06K 9/62 | (2022.01) |
| G06K 7/14 | (2006.01) |

(52) U.S. Cl.
CPC .......... G06N 20/00 (2019.01); G06K 7/1413 (2013.01); G06K 9/6218 (2013.01); G06K 9/6267 (2013.01); G06T 13/80 (2013.01)

(58) Field of Classification Search
CPC .... G06N 20/00; G06K 7/1413; G06K 9/6218; G06K 9/6267; G06K 9/6232; G06K 9/6256; G06T 13/80; G06F 17/18
See application file for complete search history.

(56) References Cited

U.S. PATENT DOCUMENTS

2014/0233010 A1* 8/2014 Baldwin .............. G01S 7/4808
356/4.01

OTHER PUBLICATIONS

Ghrist, (2008).( Barcodes: the persistenttopology of data. Bulletin of the American Mathematical Society, 45(1), 61-75.) (Year: 2008).*
Han ("Deep Residual Learning for Compressed Sensing CT Reconstruction via Persistent Homology Analysis", arXiv preprint arXiv: 1611.06391 (2016)) (Year: 2016).*
Z. Zhou, Y. Z. Huang, L. Wang, and T. N. Tan. Exploring generalized shape analysis by topological representations. Pattern Recognition Letters, 87:177-185, 2017.
M. Zeppelzauer, B. Zielin'ski, M. Juda, and M. Seidl. A study on topological descriptors for the analysis of 3d surface texture. Computer Vision and Image Understanding, 167:74-88, Feb. 2018.

(Continued)

*Primary Examiner* — Tapas Mazumder
(74) *Attorney, Agent, or Firm* — Maschoff Brennan

(57) ABSTRACT

A method may include obtaining a data set for analysis, and selecting at least one candidate of bias for predicting whether the data set includes a result that is biased based on the candidate. The method may also include generating a point cloud of the data set based on the candidate and the result. The method may additionally include computing, prior to performing classification on the data set using machine learning, persistence homology on the point cloud based on the candidate and the result. The method may also include plotting persistence barcodes based on the persistence homology, where the persistence barcodes may be indicative of a duration of complexes within the persistence homology, determining a length of a longest barcode in the persistence barcodes, and generating a quantification of the bias based on the longest barcode and a visualization of the bias based on the plot of the persistence barcodes.

20 Claims, 11 Drawing Sheets

(56) References Cited

OTHER PUBLICATIONS

B. Wang, B. Summa, V. Pascucci, and M. Vejdemo-Johansson. Branching and circular features in high dimensional data. IEEE Transactions on Visualization and Computer Graphics, 17:1902-1911, 2011.

D. Pachauri, C. Hinrichs, M.K. Chung, S.C. Johnson, and V. Singh. Topology-based kernels with application to inference problems in alzheimer's disease. Medical Imaging, IEEE Transactions on, 30(10):1760-1770, Oct. 2011b. ISSN 0278-0062. doi: 101109/TMI. 2011.2147327 Apr. 29, 2011.

D. D. Nguyen, Z. X. Cang, K. D. Wu, M. L. Wang, Y. Cao, and G. W. Wei. Mathematical deep learning for pose and binding affinity prediction and ranking in D3R Grand Challenges. arXiv preprint arXiv:1804.10647, Aug. 16, 2018.

C. Li, M. Ovsjanikov, and F. Chazal. Persistence-based structural recognition. In Proceedings of the IEEE Conference on Computer Vision and Pattern Recognition, pp. 1995-2002, 2014.

X. J. Zhu. Persistent homology: An introduction and a new text representation for natural language processing. In IJCAI, pp. 1953-1959, 2013.

L. M. Seversky, S. Davis, and M. Berger. On time-series topological data analysis: New data and opportunities. In Proceedings of the IEEE Conference on Computer Vision and Pattern Recognition Workshops, pp. 59-67, 2016.

Y. Umeda. Time series classification via topological data analysis. Information and Media Technologies, 12:228-239, 2017.

C. Pun, K. Xia and S. Lee, : Persistent-Homology-based Machine Learning and its Applications—A Survey , ArXiv Nov. 26, 2018.

R. Gabrielsson and G. Carlsson, Exposition and Interpretation of the Topology of Neural Networks, ArXiV Nov. 27, 2018.

G. Carlsson and R. Gabrielsson , Topological Approach to Deep learning , ArXiv Nov. 2, 2018.

https://www.ayasdi.com/blog/artificial-intelligence/going-deeper-understanding-convolutional-neural-networks-learn-using-tda/ Aug. 9, 2018.

Calmon et. al. Optimized Pre-processing for Discrimination Prevention , NeurIPS 2017, Dec. 4, 2017.

Kairan et al, Data Preprocessing techniques for Calssification without Discrimination, Knowledge and Information Systems 2012.

Zhang et .al., Mitigating unwanted bias with adversarial learning, AAAI 2018, Jan. 22, 2018.

Kaimran et al, Decision Theory for Discrimination-Aware Classification , ICDM 2012, Dec. 10, 2012.

https://aif360.mybluemix.net/# Sep. 19, 2018.

* cited by examiner

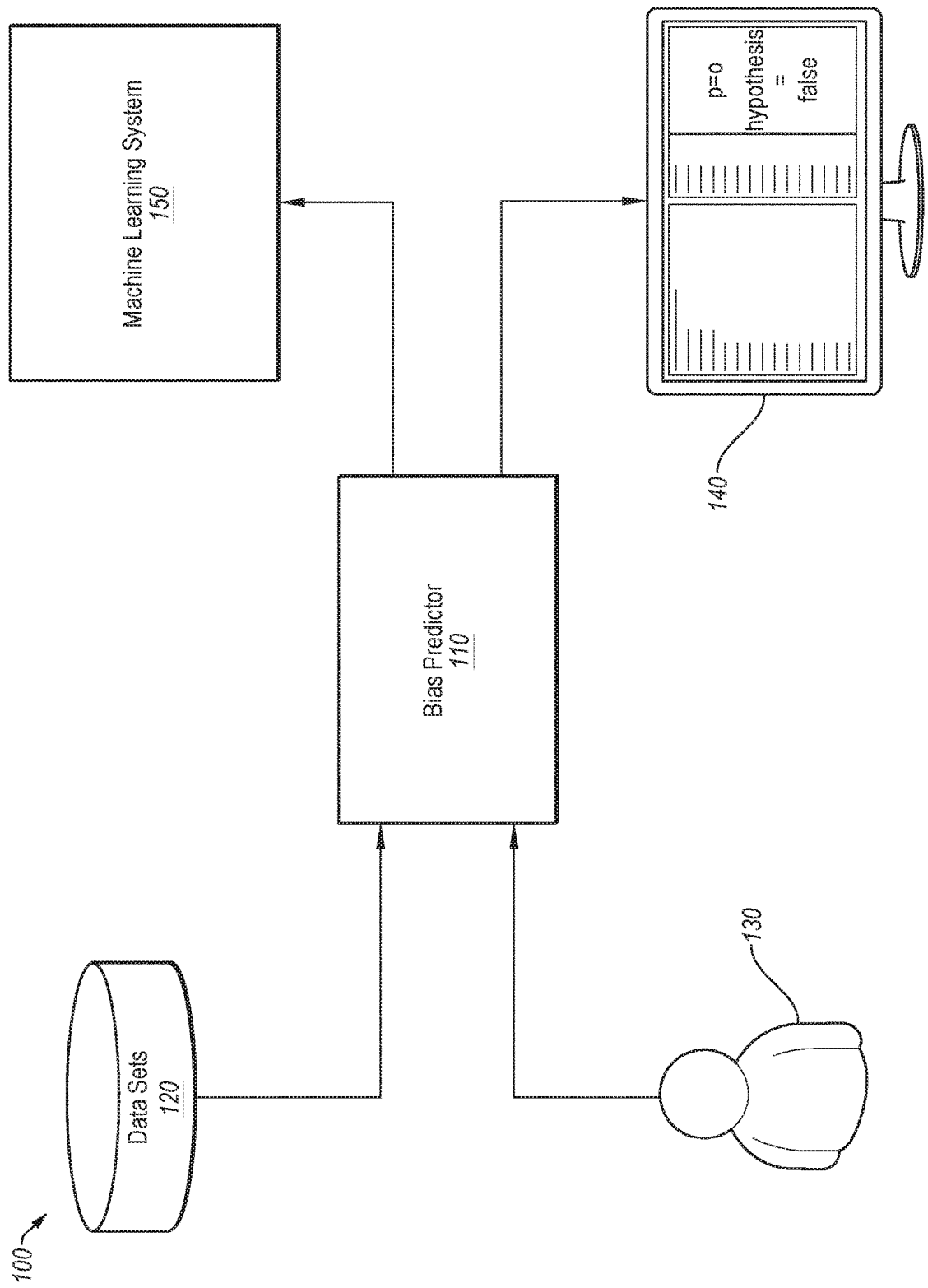

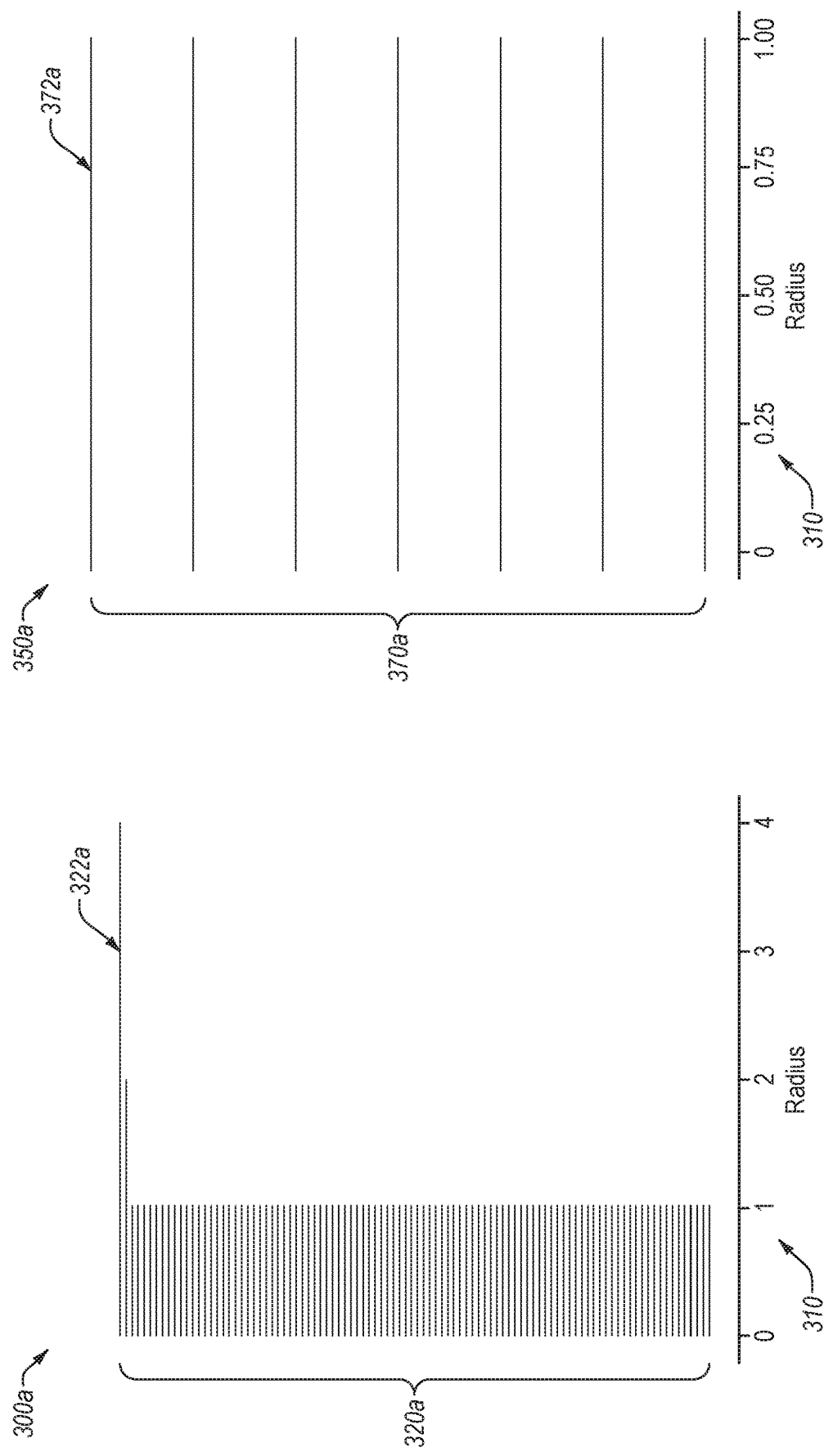

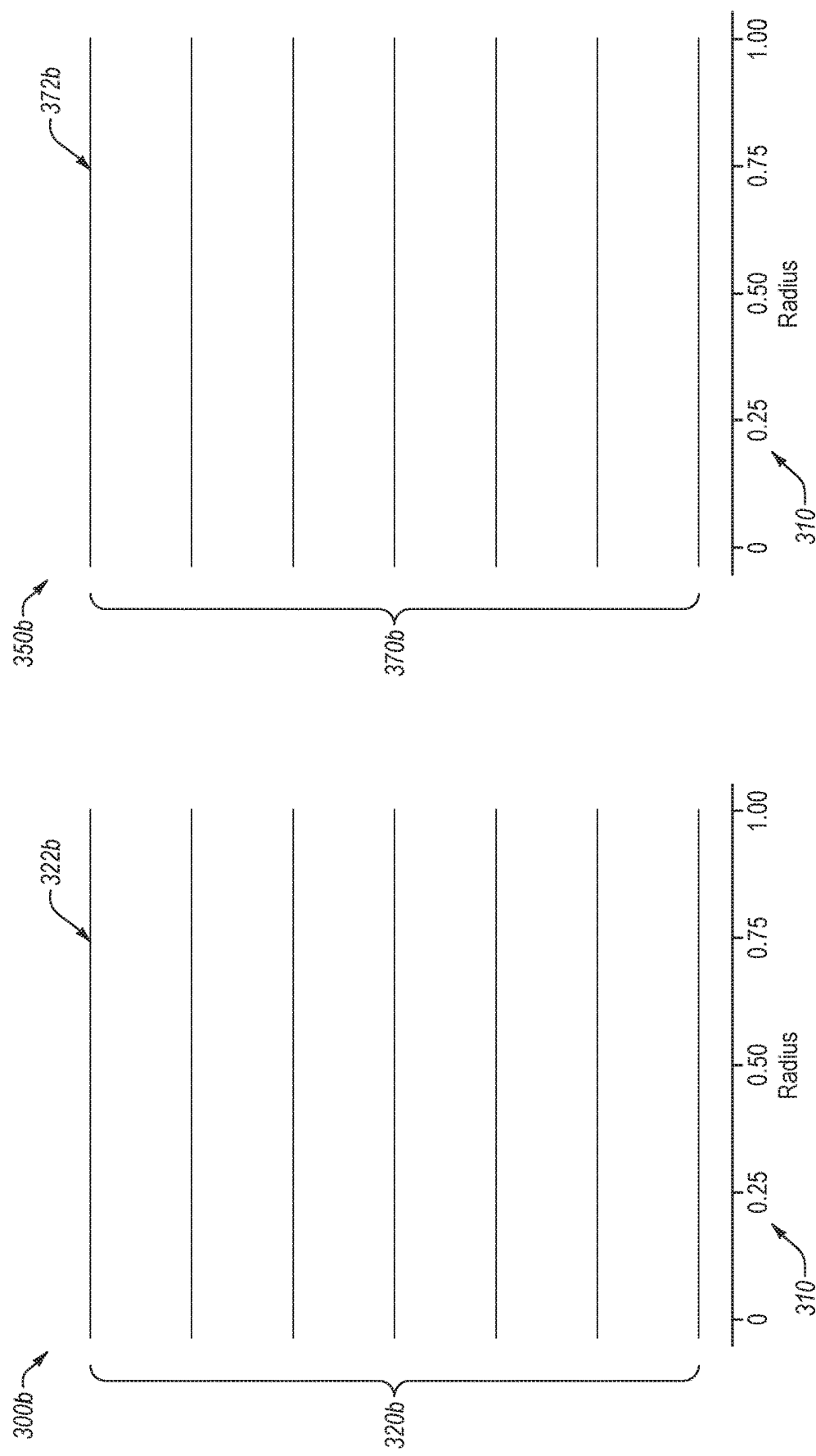

BIAS VISUALIZATION FOR DATA SETS

FIELD

Embodiments of the present disclosure relate to determination and/or visualization of bias for data sets.

BACKGROUND

Machine learning systems may analyze data sets and identify correlations between various results and/or variables associated with those results. However, such data sets may include bias in the data that is to be accounted for when the machine learning is applied to the data set.

SUMMARY

One or more embodiments of the present disclosure may include a method that includes obtaining a data set for analysis, and selecting at least one candidate of potential bias for predicting whether the data set includes a result that is biased based on the candidate. The method may also include generating a point cloud of the data set based on the candidate and the result. The method may additionally include computing, prior to performing classification on the data set using machine learning, persistence homology on the point cloud based on the candidate and the result. The method may also include plotting persistence barcodes based on the persistence homology, where the persistence barcodes may be indicative of a duration of complexes within the persistence homology, determining a length of a longest barcode in the persistence barcodes, and generating a quantification of the bias based on the longest barcode and a visualization of the bias based on the plot of the persistence barcodes.

The object and advantages of the embodiments will be realized and achieved at least by the elements, features, and combinations particularly pointed out in the claims.

It is to be understood that both the foregoing general description and the following detailed description are merely examples and explanatory and are not restrictive.

BRIEF DESCRIPTION OF THE DRAWINGS

Example embodiments will be described and explained with additional specificity and detail through the use of the accompanying drawings in which:

FIG. 1 is a diagram illustrating an example system that may be used to determine and/or visualize bias in a data set;

FIGS. 3A and 3B illustrate examples of plotted persistence barcodes to facilitate determining and/or visualizing bias in a data set;

DETAILED DESCRIPTION

Figure 2A:
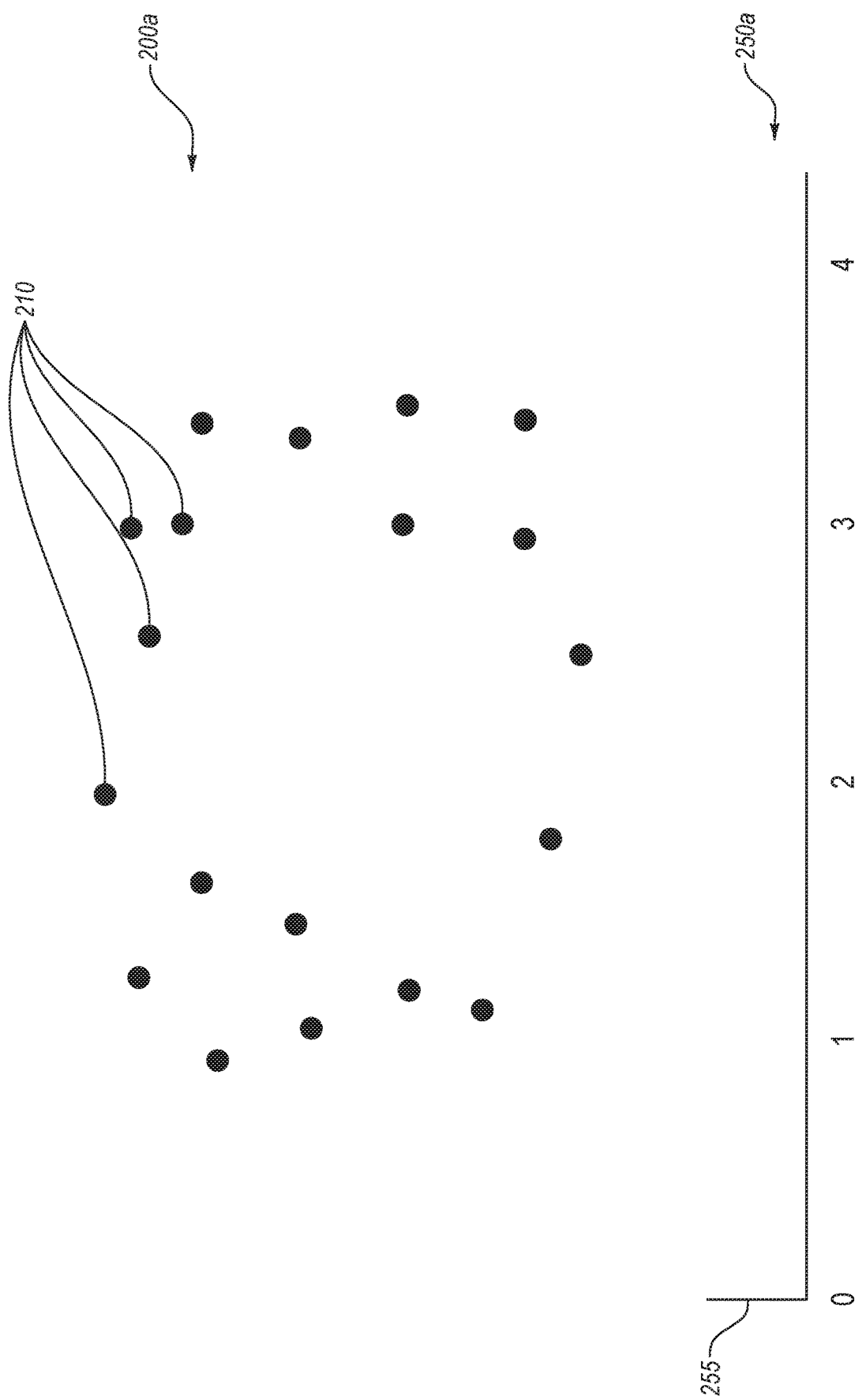
FIGS. 2A-2D include diagrams illustrating example point clouds with various simplicial complexes and/or barcodes associated with determining and/or visualizing bias in a data set.

The present disclosure relates to determination and quantification of bias in a data set before that data set is used to train a machine learning system and/or before the machine learning system performs other processing on the data set. By providing the bias to the machine learning system prior to these other tasks, the machine learning system is able to operate in a more efficient manner.

To determine the bias, a bias predictor may utilize a candidate in the data set that may or may not bias a result in the data set (e.g., if the data set included people who defaulted on loans, age may or may not bias whether or not a person defaulted on their loan). Based on the candidate and the result, the bias predictor may generate a point cloud upon which persistence homology may be performed. For example, a filtration process may be performed on the point cloud by increasing a radius in a stepwise fashion. If two points are within the increased radius of each other, an edge may be drawn between the two points. As edges are drawn, the edges may form simplexes (e.g., a triangle, tetrahedron, or their higher dimensional counterparts), and the simplexes together may form simplicial complexes (e.g., a combination of simplexes where each intersecting edge, face, or point in the complex is shared completely between the two adjacent simplexes). As the radius is increased, these simplicial complexes may form features in the point cloud, such as holes or cavities. The duration of these features may be identified using a barcode that begins at the birth radius of the feature (e.g., when a hole first forms) and ends at the death radius of the feature (e.g., when the hole is filled in by simplexes). After the radius has been increased to cover all potential edges in the point cloud, the barcodes may be plotted to determine the longest barcode. Using the longest barcode, a determination may be made whether or not bias exists for the candidate in the data set.

To facilitate the determination of bias relative to the candidate, the longest barcode may be compared to other barcodes for the candidate. Additionally or alternatively, the longest barcode and/or the distribution of barcodes for one candidate may be compared to other barcodes for another candidate. If the longest barcode(s) and/or the set(s) of barcodes are significantly different, then the candidate may impose bias. As used herein, the term "bias" may include a contributing factor that may or may not unevenly weight a result in the data set. For example, if the result in the data set were whether or not a borrower defaulted on their loan, gender, age, or zip code could all be factors that may introduce bias in the result of whether or not the borrower defaulted.

One or more example embodiments are explained with reference to the accompanying drawings.

FIG. 1 is a diagram illustrating an example system 100 that may be used to determine and/or visualize bias in a data set, in accordance with one or more embodiments of the present disclosure. The system 100 may include a bias predictor 110 that may use as inputs one or more data sets 120 (which may be referred to in the singular as a data set 120) and/or other user input from a user 130. The bias predictor 110 may determine whether or not there is bias within a given data set. The bias predictor may generate a display 140 that may include a visualization of the bias and/or a quantification of the bias. In some embodiments, the determination may be provided to a machine learning system 150 to facilitate training of the machine learning system 150 based on the determination regarding bias.

In operation, the bias predictor 110 may obtain the data set 120 to determine whether or not bias exists in the data set 120. The determination of whether or not bias exists may be performed prior to performing classification by the machine learning system 150, or in other words, may be performed as a pre-processing operation to determine whether or not bias exists in the data set 120.

The data set 120 may include any number of elements, and each element may include any number of factors that describe the element, and a result for the element. For example, the data set may include a loan default data set, where each element includes multiple factors (e.g., credit history, savings, checking account status, property, housing, job, age, gender, zip code of residence, debt to income ratio, etc. of an individual) and a result (e.g., did the individual default on their loan). Any of the factors may be used as a candidate to determine whether that particular candidate biases the result (e.g., did the person's gender, age, etc. impose a bias on whether or not they defaulted on their loan). The data set may include any results with potentially biased factors, such as job applicants and jobs awarded, traffic stops and citations issued, customer service calls and refunds issued, wildfires and regions in which they occurred, etc. While examples have been given, the present disclosure is applicable to any data sets that include a result and factors that may contribute to and/or bias that result.

In some embodiments, the bias predictor 110 may obtain a candidate of bias, along with a result that may or may not be affected by the bias of the candidate. Using the candidate and the result, a point cloud of the data set may be generated by the bias predictor 110. For example, the point cloud may include a Euclidian space with coordinates in an (x, y) form with the candidate as the x-value and the result as the y-value for the points in the point cloud.

In some embodiments, the candidate may be automatically selected (e.g., the bias predictor 110 may cycle through certain potential candidates, all potential candidates, etc.). Additionally or alternatively, the user 130 may select one or more candidates for analysis and/or comparison with other candidates. For example, the user 130 may submit a hypothesis regarding the relative bias for a pair of candidates.

The bias predictor 110 may use the point cloud generated based on the candidate and the result to perform persistence homology on the data set 120. For example, the point cloud of the data set may be analyzed by progressively (e.g., in a stepwise fashion) increasing a radius between which two points in the point cloud may be coupled by an edge if within that radius. Such a process of increasing the radius and observing the results may be referred to as a filtration process. Based on the edges, simplicial complexes generated by the edges are observed and monitored. As the radius is increased, the number of edges increases and the number of simplicial complexes increases. Stated another way, a Rips complex is formed at each stepwise increase in the radius and the progressive Rips complexes are monitored. As the simplicial complexes are formed, the combination of simplicial complexes form various features that may be observed in the point cloud, such as clusters, holes, cavities, gaps, etc. In these and other embodiments, a birth radius and death radius for each given feature is stored by the bias predictor 110, corresponding to the radius at which the feature first appeared and the radius at which it ceased to exist, respectively. Each individual birth radius and death radius may correspond to a persistence barcode. The persistence barcodes may represent the difference between the birth radius and the death radius, e.g., how long did the feature persist based on the radius length changes. The combination of persistence barcodes may be plotted relative to each other to facilitate an understanding of the relative duration of the features, and to visualize the bias.

In some embodiments, the features formed by the simplicial complexes may be of various dimensionalities depending on the data set and the analysis being performed. For example, the dimensionality of a given feature may be zero and may correspond to a cluster of data points. As another example, the dimensionality of a given feature may be one and may correspond to a hole in the data points. As an additional example, the dimensionality of a given feature may be two and may correspond to a cavity in the data points.

Using the barcodes described, the bias predictor 110 may determine whether or not the candidate causes bias in the dataset 120. For example, the longest barcode may correspond to how long a particular feature persisted. If the feature persisted for a long period of time (e.g., remained through many stepwise increases to the radius), the feature likely corresponds to bias. In contrast, if the longest barcode is relatively short, it is unlikely there is bias in the data set 120.

An example of the use of such an approach using persistence homology may be described with reference to FIGS. 2A-2D.

In some embodiments, the barcodes of a first point cloud of the data set 120 using a first candidate may be compared with barcodes of a second point cloud of the data set 120 using a second candidate. By comparing the relative lengths of the longest barcodes based on the two candidates, a relative likelihood of bias between the two candidates may be determined. For example, a permutation test may be performed on a hypothesis to determine whether or not the hypothesis is correct. Such a hypothesis may include a null hypothesis that the first candidate and the second candidate have an equal effect on bias (e.g., the first candidate and the second candidate have approximately the same length for the longest barcode) and an alternate hypothesis that the first candidate and the second candidate have unequal amounts of bias, with the result of the permutation test revealing which hypothesis (e.g., the null or alternate hypothesis) is incorrect and is to be reject.

An example of the comparison of relative barcode lengths may be described with reference to FIGS. 3A and 3B.

Based on the determination of bias by the bias predictor 110, the bias predictor 110 may utilize and/or distribute the result in a number of ways. In some embodiments, the bias predictor 110 may generate a display 140 that includes a depiction of the bias. For example, the display 140 may include a binary answer (e.g., "Yes" or "No") to whether or not a particular candidate causes bias in the data set 120. As another example, the display 140 may include a plot of the barcodes for one or more of the point clouds based on one or more of the candidates. As an additional example, the display 140 may include a statement of whether or not a hypothesis being tested was found true or false, and may include a numerical quantification of whether or not the hypothesis is true (e.g., a p value for a permutation test).

In some embodiments, the bias predictor 110 may provide the determination of bias for the candidate to the machine learning system 150. The machine learning system 150 may utilize the bias information to train the machine learning system 150 to the data set 120 in a way that accounts for and/or mitigates against the bias. Additionally or alternatively, the machine learning system 150 may perform other processing tasks or other characterization of the data set 120 that incorporates the bias determination.

In these and other embodiments, the determination of bias for the data set 120 prior to performing processing and/or characterization of the data set 120 by the machine learning system 150 may permit the machine learning system 150 to operate in a more efficient manner compared to typical machine learning systems or those without the determination of bias. For example, the determination of bias may facilitate a more rapid training of the machine learning system 150. As another example, by having the bias information before performing processing of the data set 120, the machine learning system 150 may be able to use less computing time and processing power as compared to determining bias in conjunction with or after the processing of the data set 120. By determining bias prior to processing, characterization, and/or training by the machine learning system 150, the machine learning system 150 may save valuable computing resources and improve the functioning of computer systems. Additionally, by knowing the factors that contribute to bias, efficient bias mitigation algorithms based on the specific factors may be designed. For example, if it has been determined that age contributes more bias than gender, a machine learning algorithm may be designed to give more importance to age for the purposes of mitigation than gender, thereby improving performance of the algorithm. Thus, the information obtained regarding biases in the data set 120 may serve to provide information in the design of bias mitigation machine learning algorithms contributing to superior accuracy of the machine learning system 150.

Modifications, additions, or omissions may be made to the system 100 without departing from the scope of the disclosure. For example, the designations of different elements in the manner described is meant to help explain concepts described herein and is not limiting. Further, the system 100 may include any number of other elements or may be implemented within other systems or contexts than those described.

FIGS. 2A-2D include diagrams 200a-d illustrating example point clouds with various simplicial complexes and/or barcodes associated with determining and/or visualizing bias in a data set, in accordance with one or more embodiments of the present disclosure. FIGS. 2A-2D illustrate the progression of the increase in radius to observe the progressive creation and disappearance of features such as holes, cavities, etc. created by the combination of simplicial complexes. While certain snapshots are given in FIGS. 2A-2D, the changes to the radius may be small and performed in a stepwise fashion, and the FIGS. 2A-2D may merely provide snapshots of various points throughout such a process. Additionally, FIGS. 2A-2D illustrate plots 250a-250d of persistence barcodes associated with the point cloud illustrated in the diagrams 200a-200d.

As illustrated in FIG. 2A, the diagram 200a includes a point cloud made up of points 210. The points 210 may be a plot of a candidate of potential bias in a data set and a result that may be impacted by the bias. For example, the result may include a credit score and the candidate may include age, and in such an example, the point cloud would be a plot of age vs. credit score, such as by a set of (x, y) coordinate pairs of the form (candidate, result). The plot 250a illustrates that the current radius 255 is 0 units, and as such, no features or simplicial complexes are observed.

Figure 2B:
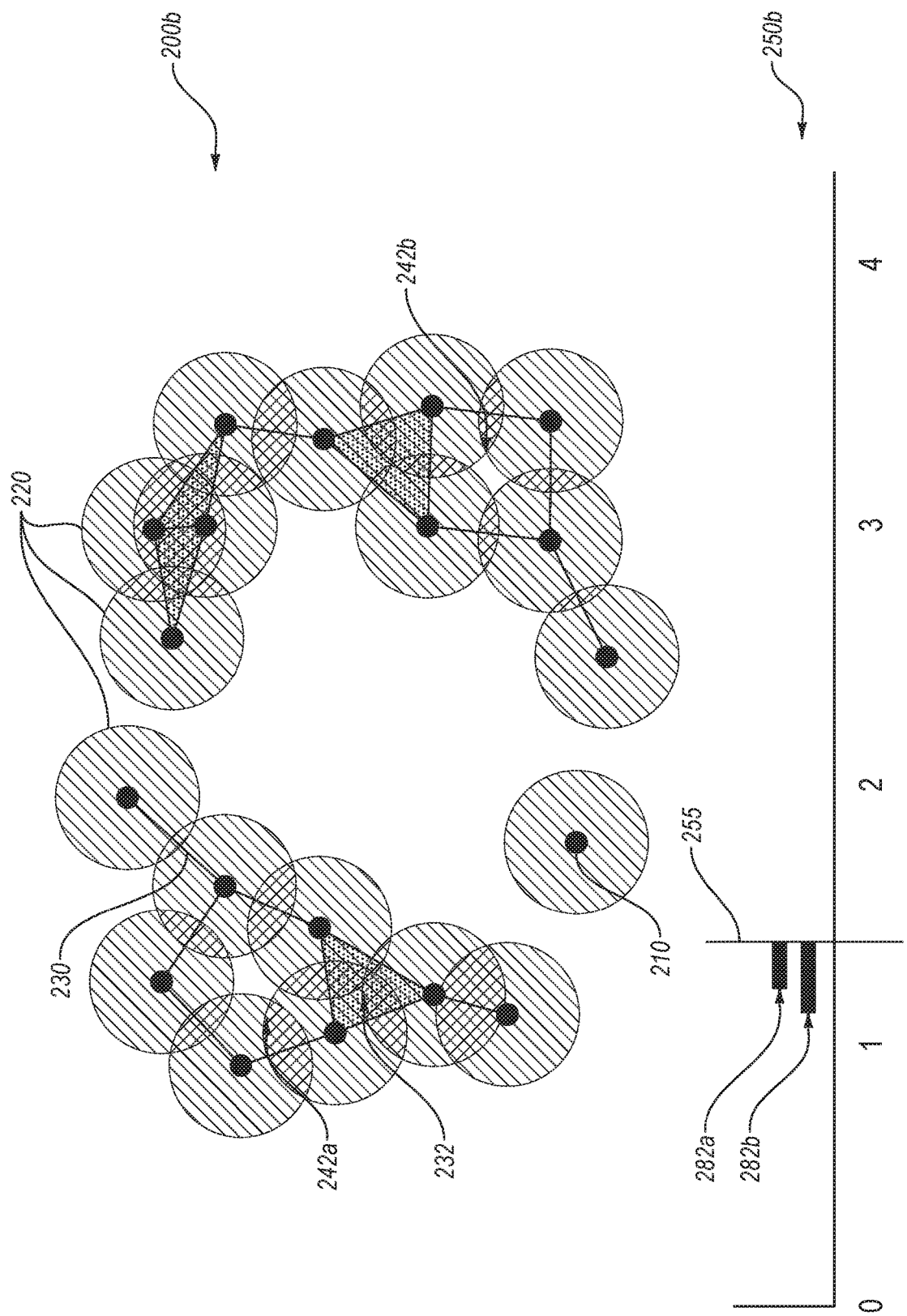

As illustrated in FIG. 2B, the current radius 255 has been increased to approximately 1.3. The circles 220 illustrate the increasing radiuses. As the circles 220 intersect, edges are formed between the two points 210 whose circles intersect.

For example, the edge 230 is formed based on the overlap between the two circles 220 associated with the adjacent points 210. In some circumstances, a series of edges forms a simplex (such as the simplex 232), and a series of simplexes may form a simplicial complex. In some circumstances, the combination of edges and simplicial complexes combine to form holes. For example, a series of edges form the holes 242a and 242b.

As illustrated in the plot 250b, two features have appeared, namely, the holes 242a and 242b, corresponding to the barcodes 282a and 282b. As the features are still present in the diagram 200b, the lengths of the barcodes 282a and 282b are still being determined.

Figure 2C:
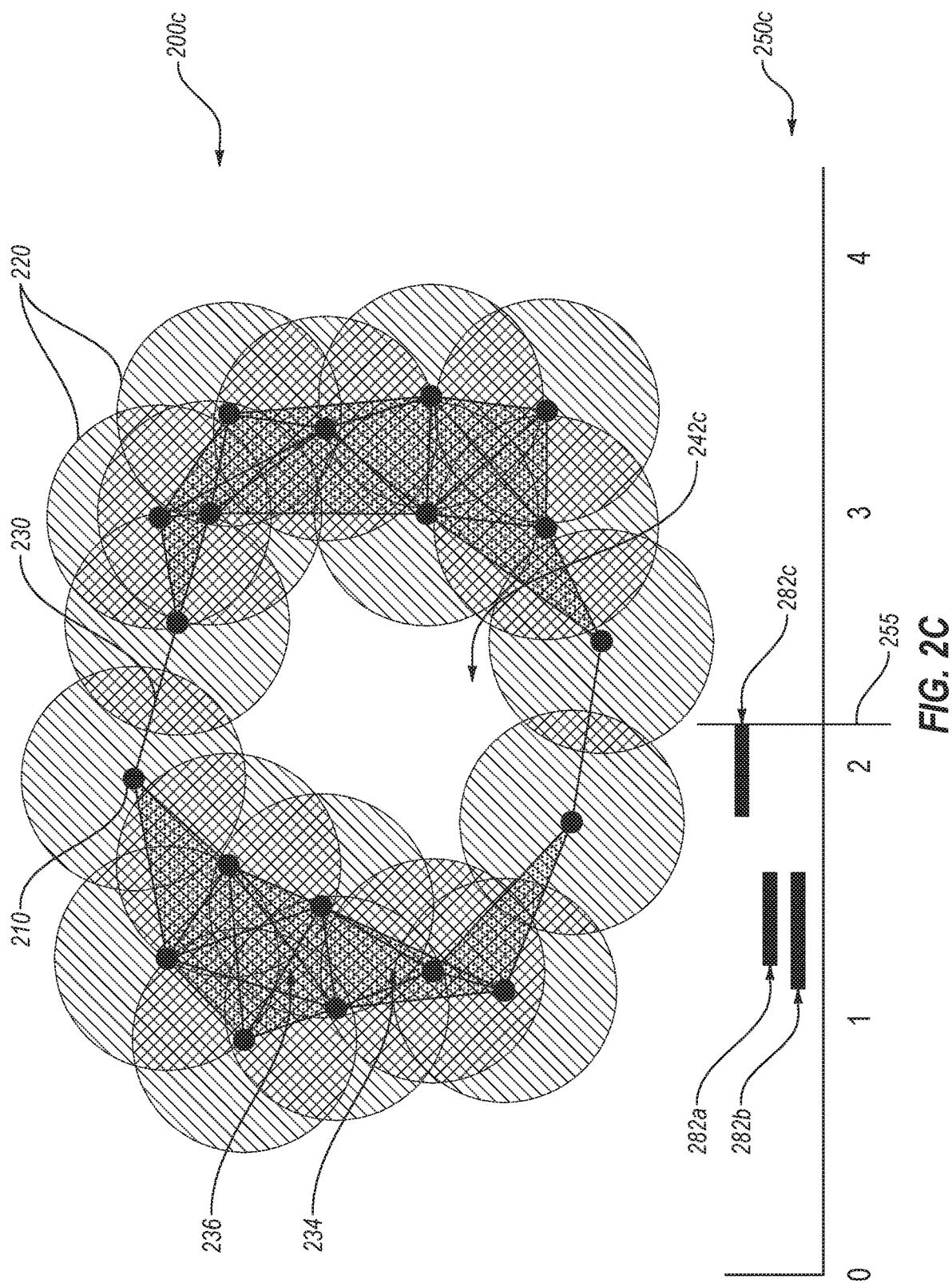

As illustrated in FIG. 2C, the current radius 255 may be increased in a stepwise manner to approximately 2.3. The circles 220 are larger compared to those of FIG. 2B, thus causing the formation of further edges 230 and complexes. For example, the tetrahedral simplexes 234 and 236 are illustrated. Furthermore, the holes 242a and 242b visible in FIG. 2B have been filled in with simplicial complexes, signaling the death of the feature. Additionally, a new feature, the hole 242c, has been formed.

As illustrated in the plot 250c, the two holes 242a and 242b visible in the FIG. 2B were filled in with simplicial complexes when the radius reached approximately 1.5. As such, the barcodes 282a and 282b terminated at the point corresponding to the radius of 1.5. The new hole 242c initially appeared when the stepwise increase of the radius reached approximately 1.8 and as such, the barcode 282c began at approximately 1.8 and continues to extend as the feature 242c continues to be present in the diagram 200c.

Figure 2D:
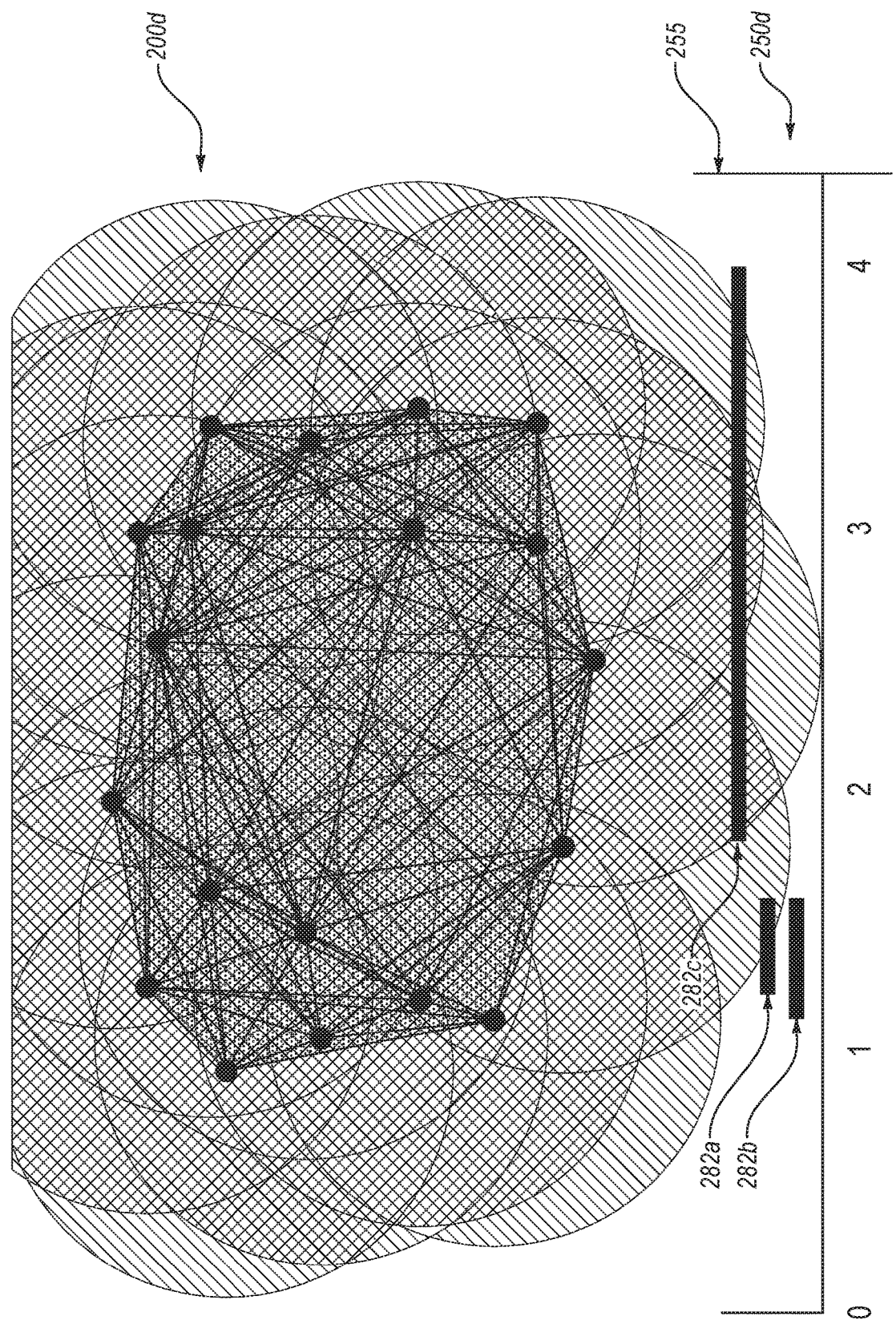

As illustrated in FIG. 2D, the current radius 255 may be extended stepwise to approximately 4.4. As illustrated in FIG. 2D, the hole 242c has been filled in with simplicial complexes, which occurred as the radius reached approximately 4.0, as illustrated by the cessation of the barcode 282c at approximately 4.0 in the plot 250d. As no further holes, cavities, or other such features are present or able to be formed by the point cloud illustrated in the diagrams 200, FIG. 2D illustrates a complete expansion of the radius.

In some embodiments, the barcodes 282a, 282b, and 282c may be plotted in a histogram or other barcode plot based on length. For example, the barcodes may be placed in vertical order starting with the barcode 282c (with a length of approximately 2.2), 282b (with a length of approximately 0.4), and 282a (with a length of approximately 0.3). In these and other embodiments, the presence of the relatively long barcode 282c relative to the other barcodes 282a and 282b may indicate the presence of bias in the data set relative to the candidate under analysis.

In some embodiments, a visualization of the stepwise increases of the radiuses and/or the formation of the simplicial complexes, and/or the generation of the barcodes such as that illustrated in FIGS. 2A-2D may be stored by a barcode predictor and strung together to generate an animation of the stepwise increase of the radiuses.

Modifications, additions, or omissions may be made to the diagrams 200a-d and/or the plots 250a-250d without departing from the scope of the disclosure. For example, the designations of different elements in the manner described is meant to help explain concepts described herein and is not limiting. Further, the diagrams 200a-d and/or the plots 250a-250d may include any number of other elements or may be implemented within other systems or contexts than those described. For example, a small number of points is illustrated for convenience in illustrating the underlying principle, where the data set leading to the point cloud may include thousands, millions, or billions of points such that the principles described herein are equally applicable to large data sets.

FIGS. 3A and 3B illustrate examples of plotted persistence barcodes to facilitate determining and/or visualizing bias in a data set, in accordance with one or more embodiments of the present disclosure. FIG. 3A illustrates a pair of plots (plots 300a and 350a) in which there is a substantial difference between the barcode lengths, and FIG. 3B illustrates a pair of plots (plots 300b and 350b) in which the barcode lengths are substantially similar. The plot 300a may be associated with a first candidate and the plot 350a may be associated with a second candidate. The plot 300b may be associated with a third candidate and the plot 350b may be associated with the second candidate.

The FIGS. 3A and 3B may include visualizations of an example test performed using a data set including 1,000 elements. The result in the data set may include loan default as the result, and the factors may include twenty distinct predictors including credit history, savings, checking account status, property, housing, job, age, gender, etc. The plot 300a is associated with age and the plot 350a is associated with gender, while the plot 300b is associated with job and the plot 350b is associated with gender.

As illustrated in FIG. 3A, the plot 300a illustrates a series of persistence barcodes 320a based on radius length 310. As described above with reference to FIGS. 2A-2D, the persistence barcodes may represent the duration during which a particular feature is present in the persistence homology process. For example, nearly all of the features were existent for a change of one unit of radius, after which the feature became deceased. However, there are two considerably longer persistence barcodes, including the longest barcode 322a. The longest barcode 322a is significantly longer than the other barcodes in the set of barcodes 320a, indicating that there is a feature that persisted for significantly longer than all of the others (such as how the barcode 282c as illustrated in FIG. 2D is significantly longer than the barcodes 282a and 282b).

In some embodiments, the length of the barcode 322a relative to the other barcodes in the set of barcodes 320a may signify the presence of bias relative to the first candidate upon which the barcodes of the plot 300a are based. For example, an average or median value of the set of barcodes 320a may be obtained, and the length of the longest barcode 322a may be compared to the length of the median or average value of the set of barcodes 320a. If the length is significantly different (e.g., 150%, 200%, 300% etc.), there may be a determination of bias. Additionally or alternatively, the relative length may provide a numerical quantification of the likelihood of bias for the first candidate.

In some embodiments, the barcodes of the plot 300a may be compared to the barcodes of the plot 350a to determine bias. For example, the longest barcode 372a of the plot 350a may be compared to the longest barcode 322a of the plot 300a. If the longest barcode 322a is significantly different from the longest barcode 372a, the difference may indicate that the first candidate associated with the plot 300a is much more likely to cause bias in the data set as compared to the second candidate associated with the plot 350a. In some embodiments, the ratio of their difference may provide a quantification of the bias. As another example, a hypothesis may be tested using a permutation test to determine whether the hypothesis is true. Such a hypothesis may be that the first candidate and the second candidate have an equal amount of bias relative to the result of the data set, and the quantification of the bias may be reflected in a p value generated by the permutation test. Such a permutation test may compare the entire set of barcodes 320a to the entire set of barcodes 370a, and or subsets thereof (such as the highest barcodes 322a and 372a and some other random selections from the sets of barcodes 320a and 370a).

In some embodiments, the pair of plots 300a and 350a may represent a visual depiction of a test of a hypothesis regarding the relative bias between the first candidate and the second candidate.

FIG. 3B illustrates the plots 300b and 350b. The plots 300b and 350b may be similar or comparable to the plots 300a and 350a of FIG. 3A. However, as illustrated in FIG. 3B, the set of barcodes 320b associated with the third candidate may be more uniformly distributed as compared to the set of barcodes 320a. For example, the longest barcode 322b is approximately 1.0 while the longest barcode 322a is approximately 4.0. The depictions of the plots 300b and 350b may include a depiction of a testing of a hypothesis regarding the relative applicability of bias between the second candidate and the third candidate.

In some embodiments, the same comparison and processing may be performed on the longest barcodes 322b and 372b, and/or the sets of barcodes 320b and 370b as described above with respect to FIG. 3A. As illustrated in the plots 300b and 350b, the distribution and longest barcode are approximately the same for both sets of barcodes 320b and 370b. In such a circumstance, it may be determined that there is no bias for both the second and the third candidates, and/or it may be determined that the third candidate is as likely as the second candidate to cause bias in the data set.

In some embodiments, relative determinations may be made based on the relative comparisons between the first candidate and the second candidate (as illustrated by the plots 300a and 350a) and the third candidate and the second candidate (as illustrated by the plots 300b and 350b). For example, because the third candidate and the second candidate are equally as likely to impose bias on the data set, and a relative value of bias may be determined between the first candidate and the second candidate, the same relative value of bias may be implied as between the first candidate and the third candidate. Additionally or alternatively, the plots 300a and 300b and/or their respective barcodes (which may have been generated previously) may be utilized in determining relative bias, rather than regenerating new plots if testing a hypothesis between the first and the third candidates.

In some embodiments, visualizations such as the plots 300a, 300b, 350a, and/or 350b may be included as a visualization of bias when generating an output by a bias predictor (such as the bias predictor 110 of FIG. 1). Additionally, the bias predictor may process through each potential pairing of candidates to determine the relative likelihood of bias for each candidate of interest.

Modifications, additions, or omissions may be made to the plots 300a, 300b, 350a, and/or 350b without departing from the scope of the disclosure. For example, the designations of different elements in the manner described is meant to help explain concepts described herein and is not limiting. Further, the plots 300a, 300b, 350a, and/or 350b may include any number of other elements or may be implemented within other systems or contexts than those described.

Figure 4:
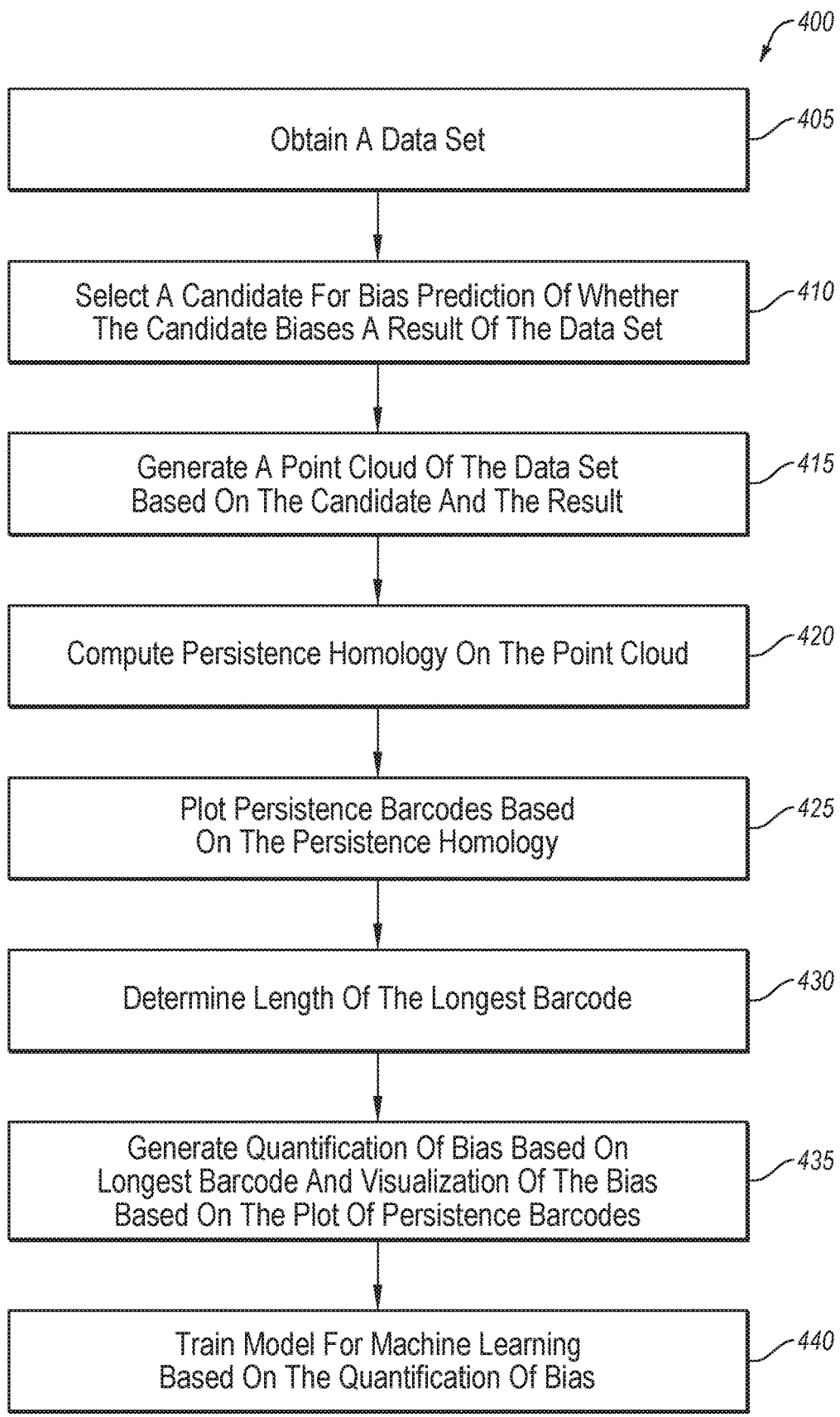
FIG. 4 illustrates an example flowchart of an example method facilitating determination and/or visualization of bias in a data set.

FIG. 4 illustrates an example flowchart of an example method 400 facilitating determination and/or visualization of bias in a data set, in accordance with one or more embodiments of the present disclosure. One or more operations of the method 400 may be performed by a system or device, or combinations thereof, such as the system 100, the bias predictor 110, and/or the machine learning system 150 of FIG. 1. Although illustrated as discrete blocks, various blocks of the method 400 may be divided into additional blocks, combined into fewer blocks, or eliminated, depending on the desired implementation.

At block 405, a data set may be obtained. The data set may contain any number of elements and may include multiple components. For example, the data set may include any number of factors and one or more results to which the factors may or may not contribute. The data set may be obtained from a third party computing device, input by a user, or obtained in any other manner.

At block 410, a candidate may be selected for bias prediction of whether the candidate biases a result of the data set. For example, a bias predictor (such as the bias predictor 110 of FIG. 1) may automatically select one or more candidates for analysis to determine the bias associated with the candidates. Additionally or alternatively, a user may input candidates for which the bias predictor is to determine bias. In some embodiments, the bias predictor may cycle through all or a subset of all potential candidates to determine relative bias. In some embodiments, the candidates may be selected based on one or more legally protected classifications, such as gender, age, race, sexual orientation, etc.

At block 415, a point cloud may be generated for the data set based on the candidate and the result. For example, a series of (x, y) points in a Euclidian space may be points where the x-value is the candidate and the y-value is the result for each of the elements in the data set.

At block 420, persistence homology may be computed on the point cloud. For example, the bias predictor may perform a filtration process by slowly and/or in a stepwise fashion increasing a radius for generating Rips complexes for the point cloud. During the stepwise increase of the radius, the birth radius and death radius for various features such as holes, cavities, etc. may be obtained and/or stored. In these and other embodiments, the difference between the birth radius and death radius for a given feature may be stored as a persistence barcode associated with the given feature. An example visualization of this process may be illustrated in FIGS. 2A-2D.

At block 425, persistence barcodes may be plotted based on the persistence homology. For example, the bias predictor may plot the persistence barcodes generated during the block 420 in a histogram or other plot from longest to shortest.

At block 430, the length of the longest barcode may be determined. For example, the plot of the persistence barcodes of the block 425 may be analyzed to obtain the longest barcode, and the length thereof may be determined.

At block 435, a quantification of the bias may be generated based on the longest barcode. Additionally or alternatively, a visualization of the bias may be generated based on the plot of the persistence barcodes. For example, the bias predictor may compare the longest barcode associated with the point cloud for the candidate with one or more other longest barcodes for other candidates. Additionally or alternatively, a relative value of the longest barcode to the other barcodes in the plot of the persistence barcodes generated in the persistence homology of the block 420 may be determined. Such a relative value may be based on a comparison of the longest barcode to a mean, an average, etc. of the set of barcodes generated in the persistence homology of the block 420.

In some embodiments, the visualization of the bias may include any visualization based on the determination of the bias. For example, the visualization may include the plot of the persistence barcodes. As another example, the visualization may include one or more of the plots of the point cloud with the radius at various lengths, such as illustrated in FIGS. 2A-2D. Additionally or alternatively, the visualization may include multiple such plots of the point cloud for a series of radiuses strung together in an animation of the increase in radius.

At block 440, a machine learning model may be trained based on the quantification of bias from the block 435. For example, the bias predictor may provide the quantified bias to a machine learning system (such as the machine learning system 150 of FIG. 1) such that the machine learning system may be trained in a manner that mitigates against the bias. For example, the machine learning system may adjust certain aspects of the data set when used in training to counteract the bias such that the machine learning system may perform more accurately. Continuing the example of the loan default, where bias may have been determined based on age, the machine learning system may mitigate against the bias such that when a data of a new person is provided to the machine learning system to determine whether or not the person will default on their loan, the machine learning system has been trained in a manner that accounts for the bias based on age. Furthermore, because the bias is identified prior to processing of data by the machine learning system and/or training by the machine learning system, the machine learning system may be trained in a more efficient manner than it could be without the bias quantification.

Modifications, additions, or omissions may be made to the method 400 without departing from the scope of the disclosure. For example, the operations of the method 400 may be implemented in differing order. Additionally or alternatively, two or more operations may be performed at the same time. Furthermore, the outlined operations and actions are provided as examples, and some of the operations and actions may be optional, combined into fewer operations and actions, or expanded into additional operations and actions without detracting from the essence of the disclosed embodiments.

Figure 5:
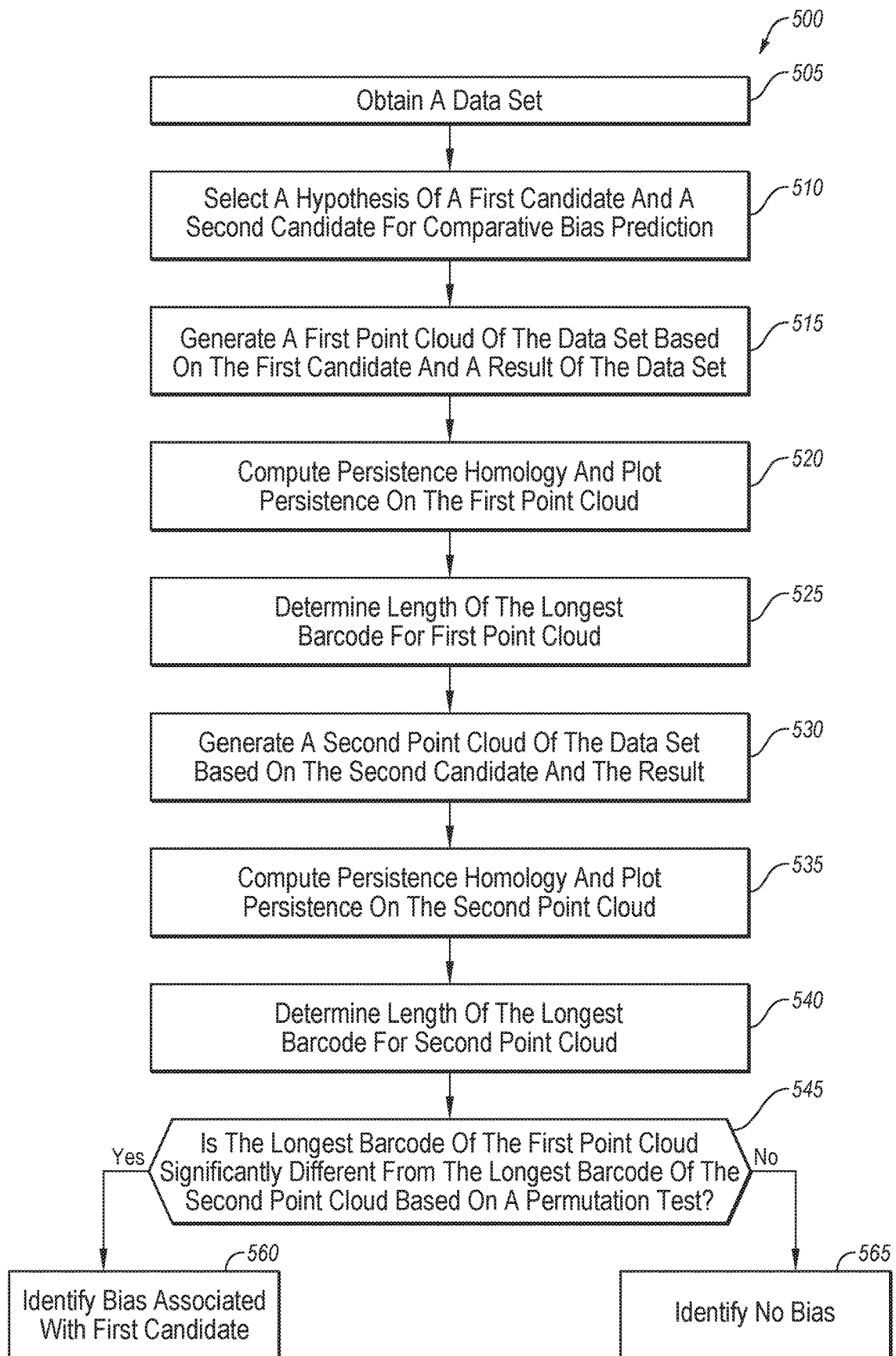
FIG. 5 illustrates another example flowchart of another example method facilitating determination and/or visualization of bias in a data set.

FIG. 5 illustrates another example flowchart of another example method 500 facilitating determination and/or visualization of bias in a data set, in accordance with one or more embodiments of the present disclosure. One or more operations of the method 500 may be performed by a system or device, or combinations thereof, such as the system 100, the bias predictor 110, and/or the machine learning system 150 of FIG. 1. Although illustrated as discrete blocks, various blocks of the method 500 may be divided into additional blocks, combined into fewer blocks, or eliminated, depending on the desired implementation.

At block 505, a data set may be obtained. The block 505 may be similar or comparable to the block 405 of FIG. 4.

At block 510, a hypothesis may be selected of a first candidate and a second candidate for comparative bias prediction. For example, a bias predictor (such as the bias predictor 110 of FIG. 1) may automatically select two candidates for comparison. Additionally or alternatively, a user (such as the user 130 of FIG. 1) may manually input two candidates for comparative bias prediction. In some embodiments, the hypothesis may include a statement to be determined whether or not the statement is true, such as "the bias between the two candidates is the same," or "the bias between the two candidates is significantly different."

At block 515, a first point cloud of the data set may be generated based on the first candidate and a result of the data set. The block 515 may be similar or comparable to the block 415 of FIG. 4, although the point cloud may be generate based on the first candidate.

At block 520, persistence homology may be computed on the first point cloud. The block 520 may be similar or comparable to the block 420 of FIG. 4, although the persistence homology may be computed for the first point cloud.

At block 525, the length of the longest barcode for the first point cloud may be determined. In some embodiments, the block 525 may include comparing the barcode lengths of all barcodes generated at the block 520 to identify the longest barcode. In these and other embodiments, the determination of the longest barcode may be facilitated by plotting the barcodes, such as described with reference to the block 425 of FIG. 4.

At block 530, a second point cloud of the data set may be generated based on the second candidate and the result of the data set. The block 530 may be similar or comparable to the block 515, except performed based on the second candidate rather than the first candidate.

At block 535, persistence homology may be computed on the second point cloud. The block 535 may be similar or comparable to the block 520, except computed for the second point cloud rather than the first point cloud.

At block 540, the length of the longest barcode for the first point cloud may be determined. The block 540 may be similar or comparable to the block 525, except determined based on the second point cloud rather than the first point cloud.

At block 545, a determination may be made whether or not the longest barcode of the first point cloud is significantly different from the longest barcode of the second point cloud based on a permutation test. For example, barcodes of both the first and the second point clouds may be combined and redistributed to form two new distributions of barcodes. From the new distributions, samples may be drawn upon which the hypotheses are tested. Such a process may be repeated multiple times based on the samples drawn. Based on the statistics of all the results from the various hypotheses corresponding to different samples, a conclusion may be made regarding the hypothesis (e.g., if the length of the longest barcodes from the two distributions of barcodes is the same or is significantly different). Additionally or alternatively, a numerical comparison between the relative lengths of the longest barcodes may be performed. If there is a significant difference, the method 500 may proceed to block 560. If there is not a significant difference, the method 500 may proceed to block 565.

At block 560, bias may be identified as being associated with the first candidate based on the significant difference between the longest barcode lengths for the two candidates.

At block 565, an identification may be made of no bias for either the first or the second candidate. For example, based on the two longest barcodes and/or distributions of all barcodes being approximately the same, the bias predictor may determine that no bias exists for the candidates. Additionally or alternatively, the bias predictor may determine that the two candidates exhibit a comparatively same amount of bias, and may compare the relative amount of bias to other determinations performed to determine whether or not the first and the second candidates bias the result of the data set.

Modifications, additions, or omissions may be made to the method 500 without departing from the scope of the disclosure. For example, the operations of the method 500 may be implemented in differing order. Additionally or alternatively, two or more operations may be performed at the same time. Furthermore, the outlined operations and actions are provided as examples, and some of the operations and actions may be optional, combined into fewer operations and actions, or expanded into additional operations and actions without detracting from the essence of the disclosed embodiments.

Figure 6:
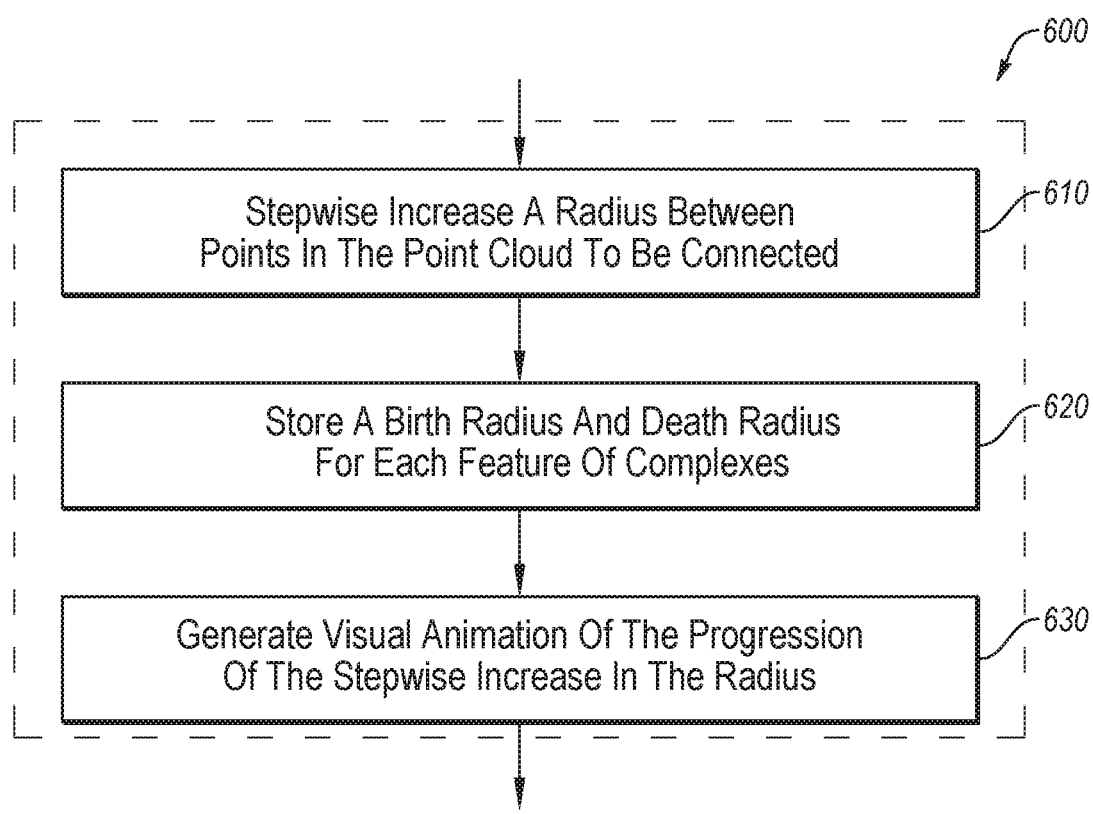
FIG. 6 illustrates another example flowchart of an example method of generating a Rips complex to facilitate determination and/or visualization of bias in a data set.

FIG. 6 illustrates another example flowchart of an example method 600 of generating a Rips complex to facilitate determination and/or visualization of bias in a data set, in accordance with one or more embodiments of the present disclosure. One or more operations of the method 600 may be performed by a system or device, or combinations thereof, such as the system 100, the bias predictor 110, and/or the machine learning system 150 of FIG. 1. Although illustrated as discrete blocks, various blocks of the method 600 may be divided into additional blocks, combined into fewer blocks, or eliminated, depending on the desired implementation. In some embodiments, the method 600 may be an expansion of the operation 420 of FIG. 4 and/or the operations 520 and/or 535 of FIG. 5.

At block 610, a radius between points in a point cloud to be connected may be increased in a stepwise fashion. For example, in a persistence homology computation, the radius may designate a distance where two points, if within that distance, will have an edge drawn therebetween. Additionally, any simplexes formed by the edges may be identified and/or formed into simplicial complexes. As the radius is increased, the formation of features such as holes, cavities, etc. by the simplicial complexes may be identified.

At block 620, a birth radius and a death radius may be stored for each of the features formed by the complexes. For example, when a hole is first formed, the radius at which the hole is formed may be stored, and when the hole is closed in by simplexes, the radius at which the hole is closed in may be stored. In these and other embodiments, the difference between the death radius and the birth radius may be stored as a barcode associated with a particular feature.

At block 630, a visual animation may be generated of the progression of the stepwise increases in the radius. For example, a visual depiction of the data points and the simplicial complexes may be stored for each of the radiuses or a subset of the radiuses used in the stepwise increasing of the radiuses at the block 610. The series of visual depictions may be strung together in an animation of the formation simplexes, and/or the formation and cessation of various features based on the simplicial complexes.

Modifications, additions, or omissions may be made to the method 600 without departing from the scope of the disclosure. For example, the operations of the method 600 may be implemented in differing order. Additionally or alternatively, two or more operations may be performed at the same time. Furthermore, the outlined operations and actions are provided as examples, and some of the operations and actions may be optional, combined into fewer operations and actions, or expanded into additional operations and actions without detracting from the essence of the disclosed embodiments.

Figure 7:
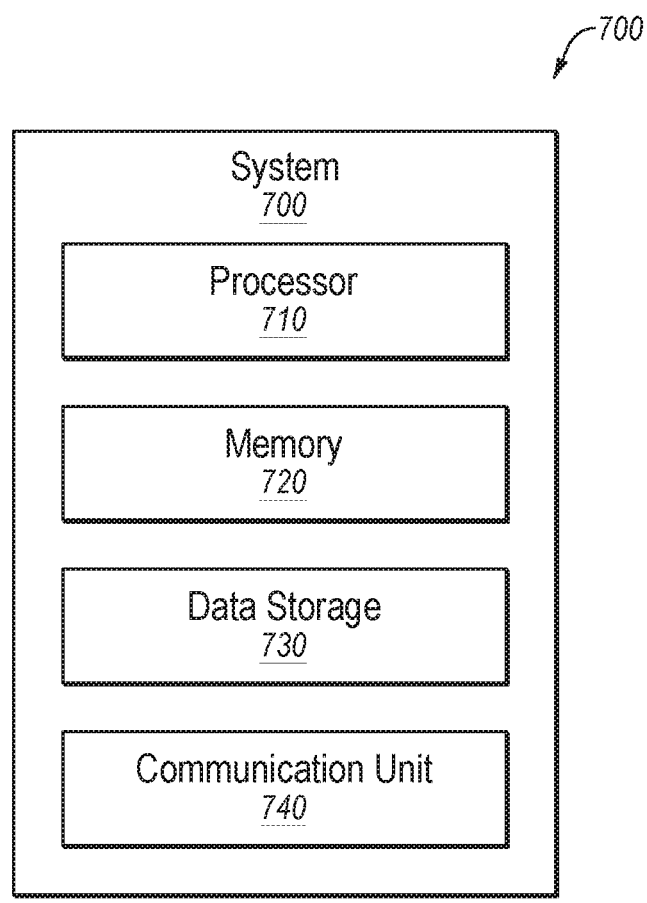
FIG. 7 illustrates an example computing system.

FIG. 7 illustrates an example computing system 700 to facilitate determining and/or visualizing bias in a data set, according to at least one embodiment described in the present disclosure. The computing system 700 may include a processor 710, a memory 720, a data storage 730, and/or a communication unit 740, which all may be communicatively coupled. Any or all of the system 100 of FIG. 1 may be implemented as a computing system consistent with the computing system 700, including the bias predictor 110 and/or the machine learning system 150. For example, the bias predictor 110 may be configured to obtain a data set, generate a point cloud based on a candidate and a result of the data set, perform persistence homology based on the point cloud, and quantify the bias based on the longest barcode generated in the persistence homology.

Generally, the processor 710 may include any suitable special-purpose or general-purpose computer, computing entity, or processing device including various computer hardware or software modules and may be configured to execute instructions stored on any applicable computer-readable storage media. For example, the processor 710 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 7, it is understood that the processor 710 may include any number of processors distributed across any number of network or physical locations that are configured to perform individually or collectively any number of operations described in the present disclosure. In some embodiments, the processor 710 may interpret and/or execute program instructions and/or process data stored in the memory 720, the data storage 730, or the memory 720 and the data storage 730. In some embodiments, the processor 710 may fetch program instructions from the data storage 730 and load the program instructions into the memory 720.

After the program instructions are loaded into the memory 720, the processor 710 may execute the program instructions, such as instructions to perform any of the processes 400, 500, and/or 600 of FIGS. 4, 5, and 6, respectively. For example, the processor 710 may obtain instructions regarding determining bias in a data set.

The memory 720 and the data storage 730 may include computer-readable storage media or one or more computer-readable storage mediums for carrying or having computer-executable instructions or data structures stored thereon. Such computer-readable storage media may be any available media that may be accessed by a general-purpose or special-purpose computer, such as the processor 710. In some embodiments, the computing system 700 may or may not include either of the memory 720 and the data storage 730.

By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 710 to perform a certain operation or group of operations.

The communication unit 740 may include any component, device, system, or combination thereof that is configured to transmit or receive information over a network. In some embodiments, the communication unit 740 may communicate with other devices at other locations, the same location, or even other components within the same system. For example, the communication unit 740 may include a modem, a network card (wireless or wired), an optical communication device, an infrared communication device, a wireless communication device (such as an antenna), and/or chipset (such as a Bluetooth device, an 802.6 device (e.g., Metropolitan Area Network (MAN)), a WiFi device, a WiMax device, cellular communication facilities, or others), and/or the like. The communication unit 740 may permit data to be exchanged with a network and/or any other devices or systems described in the present disclosure. For example, the communication unit 740 may allow the system 700 to communicate with other systems, such as computing devices and/or other networks.

One skill in the art, after reviewing this disclosure, may recognize that modifications, additions, or omissions may be made to the system 700 without departing from the scope of the present disclosure. For example, the system 700 may include more or fewer components than those explicitly illustrated and described.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, it may be recognized that changes may be made in form and detail without departing from the scope of the present disclosure. Thus, the present disclosure is limited only by the claims.

In some embodiments, the different components, modules, engines, and services described herein may be implemented as objects or processes that execute on a computing system (e.g., as separate threads). While some of the systems and processes described herein are generally described as being implemented in software (stored on and/or executed by general purpose hardware), specific hardware implementations or a combination of software and specific hardware implementations are also possible and contemplated.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

Additionally, the use of the terms "first," "second," "third," etc. are not necessarily used herein to connote a specific order. Generally, the terms "first," "second," "third," etc., are used to distinguish between different elements. Absence a showing of a specific that the terms "first," "second," "third," etc. connote a specific order, these terms should not be understood to connote a specific order.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that various changes, substitutions, and alterations could be made hereto without departing from the spirit and scope of the present disclosure.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A method, comprising:
   obtaining a data set for analysis;
   selecting at least one candidate of potential bias for predicting whether the data set includes a result that is biased based on the candidate;
   generating a point cloud of the data set based on the candidate and the result;
   computing, prior to performing classification on the data set using machine learning, persistence homology on the point cloud based on the candidate and the result;
   plotting persistence barcodes based on the persistence homology, the persistence barcodes indicative of a duration of complexes within the persistence homology;
   determining a length of a longest barcode in the persistence barcodes; and
   generating a quantification of the bias based on the longest barcode and a visualization of the bias based on the plot of the persistence barcodes.

2. The method of claim 1, further comprising:
   selecting a second candidate of the data set for predicting whether the result in the data set is biased based on the second candidate;
   generating a second point cloud of the data set based on the second candidate and the result;
   plotting a second set of persistence barcodes based on the second candidate and the result;
   determining a length of a longest barcode in the second set of persistence barcodes; and
   determining a relative bias between the candidate and the second candidate based on relative lengths of the longest barcode in the persistence barcodes and the longest barcode in the second set of persistence barcodes.

3. The method of claim 2, wherein generating the quantification of the bias includes performing a permutation test on a hypothesis that the set of persistence barcodes and the second set of persistence barcodes are the same.

4. The method of claim 1, wherein computing the persistent homology comprises generating a Rips complex by operations comprising:
   stepwise increasing a radius between which points in the point cloud are to be connected; and
   storing a birth radius for each feature of complexes when the feature appears and a death radius when the feature ceases to appear;
   wherein the persistence barcodes are representative of an interval between the birth radius and the death radius.

5. The method of claim 4, further comprising generating a visual animation of a progression of the stepwise increase in the radius in the point cloud.

6. The method of claim 1, further comprising:
   training a model for machine learning based on the quantification of the bias of the candidate relative to the result, the training occurring more quickly than without the quantification of the bias.

7. The method of claim 1, wherein the longest barcode is based on a feature of dimension zero and indicates a corresponding cluster.

8. The method of claim 1, wherein the longest barcode is based on a feature of dimension one and indicates a corresponding hole.

9. The method of claim 1, wherein the longest barcode is based on a feature of dimension two and indicates a corresponding cavity.

10. A non-transitory computer-readable medium containing instructions that, when executed by one or more processors, are configured to perform operations, the operations comprising:
    obtain a data set for analysis;
    select at least one candidate of potential bias for predicting whether the data set includes a result that is biased based on the candidate;
    generate a point cloud of the data set based on the candidate and the result;

compute, prior to performing classification on the data set using machine learning, persistence homology on the point cloud based on the candidate and the result;

plot persistence barcodes based on the persistence homology, the persistence barcodes indicative of a duration of complexes within the persistence homology;

determine a length of a longest barcode in the persistence barcodes; and generate a quantification of the bias based on the longest barcode and a visualization of the bias based on the plot of the persistence barcodes.

11. The computer-readable medium of claim 10, the operations further comprising:

select a second candidate of the data set for predicting whether the result in the data set is biased based on the second candidate;

generate a second point cloud of the data set based on the second candidate and the result;

plot a second set of persistence barcodes based on the second candidate and the result;

determine a length of a longest barcode in the second set of persistence barcodes; and determine a relative bias between the candidate and the second candidate based on relative lengths of the longest barcode in the persistence barcodes and the longest barcode in the second set of persistence barcodes.

12. The computer-readable medium of claim 11, wherein generating the quantification of the bias includes performing a permutation test on a hypothesis that the set of persistence barcodes and the second set of persistence barcodes are the same.

13. The computer-readable medium of claim 10, wherein computing the persistent homology comprises generating a Rips complex by operations comprising:

stepwise increase a radius between points in the point cloud to be connected; and store a birth radius for each feature when the feature appears and a death radius when the feature ceases to appear;

wherein the persistence barcodes are representative of an interval between the birth radius and the death radius.

14. The computer-readable medium of claim 13, the operations further comprising generate a visual animation of a progression of the stepwise increase in the radius in the point cloud.

15. The computer-readable medium of claim 10, the operations further comprising:

train a model for machine learning based on the quantification of the bias of the candidate relative to the result, the training occurring more quickly than without the quantification of the bias.

16. The computer-readable medium of claim 10, wherein the longest barcode is based on a feature of dimension zero and indicates a corresponding cluster.

17. The computer-readable medium of claim 10, wherein the longest barcode is based on a feature of dimension one and indicates a corresponding hole.

18. The computer-readable medium of claim 10, wherein the longest barcode is based on a feature of dimension two and indicates a corresponding cavity.

19. A system comprising:

one or more processors;

a display device in communication with the one or more processors; and one or more non-transitory computer-readable media containing instructions, which when executed by the one or more processors, cause the system to perform operations comprising:

obtain a data set for analysis;

select at least one candidate of potential bias for predicting whether the data set includes a result that is biased based on the candidate;

generate a point cloud of the data set based on the candidate and the result;

compute, prior to performing classification on the data set using machine learning, persistence homology on the point cloud based on the candidate and the result;

plot persistence barcodes based on the persistence homology, the persistence barcodes indicative of a duration of complexes within the persistence homology;

determine a length of a longest barcode in the persistence barcodes;

generate a quantification of the bias based on the longest barcode and a visualization of the bias based on the plot of the persistence barcodes; and output to the display device the quantification of the bias and the visualization of the bias.

20. The system of claim 19, wherein computing the persistent homology comprises generating a Rips complex by operations comprising:

stepwise increasing a radius between which points in the point cloud are to be connected; and storing a birth radius for each feature of complexes when the feature appears and a death radius when the feature ceases to appear;

wherein the persistence barcodes are representative of an interval between the birth radius and the death radius;

and wherein the operations further comprises:

generating a visual animation of a progression of the stepwise increase in the radius in the point cloud; and outputting the visual animation via the display device.

* * * * *